Figure 1:
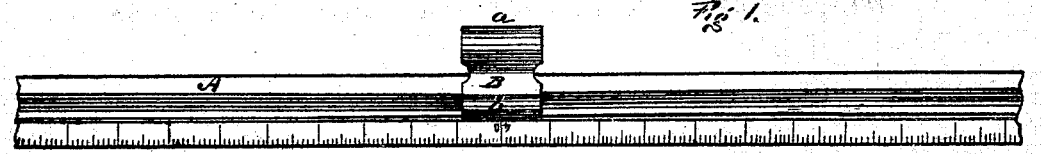

S. HASLETT.
Guards for Drafting Scales.

No. 146,673.

Patented Jan. 20, 1874.

Witnesses.

Inventor.
Sullivan Haslett

UNITED STATES PATENT OFFICE.

SULLIVAN HASLETT, OF BROOKLYN, NEW YORK.

IMPROVEMENT IN GUARDS FOR DRAFTING-SCALES.

Specification forming part of Letters Patent No. 146,673, dated January 20, 1874; application filed May 29, 1873.

*To all whom it may concern:*

Be it known that I, SULLIVAN HASLETT, of Brooklyn, in the county of Kings and State of New York, have invented a new and Improved Scale-Guard; and that the following is a full, clear, and exact description of the same, reference being had to the accompanying drawings, and to the letters of reference marked thereon, making a part of this specification.

This invention relates to the use of scales of measurement, such as are used by draftsmen and others; and the invention consists in providing the scale with an adjustable shield or guard, by means of which all liability to accidentally use a scale other than the one upon which the drawing is being constructed is obviated.

The device applies more particularly to a rule upon which is represented a series of different scales; and the device is equally applicable to scales or rules of any given shape or material.

Figure 2:
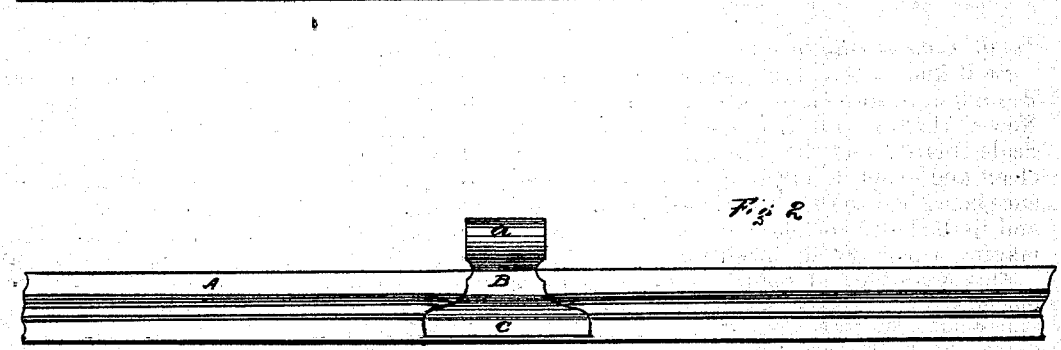
Figure 3:
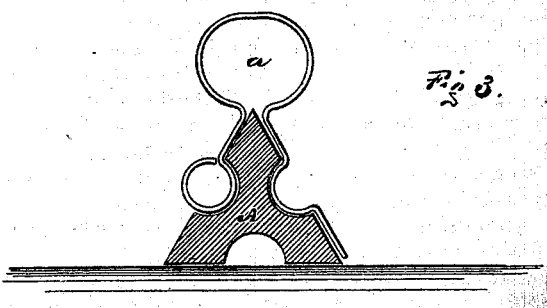

In the accompanying sheet of drawings, Figure 1 is a front view of my device attached to a triangular ruler. Fig. 2 is a rear view thereof, and Fig. 3 is a central vertical section.

A represents a ruler having represented on its surface six different scales of measurement. Sliding or otherwise fitting onto this ruler is a metallic shield or guard, B, which is held in position by elastic force, the guard being bent in the shape of a spring. The upper or projecting part $a$ of the guard B forms a convenient handle, by which the ruler may be raised from the paper. This guard has two sides, $b$ and $c$, which may be formed to fit a ruler of any desired shape. The front side $b$ of the guard extends downward immediately over the scale it is desired to use, and the rear side $c$ extends over the scale on the opposite side of the ruler, covering the designating number of the scale.

My device being constructed substantially as above described, it is used by placing the guard onto the ruler in such manner as to bring the front side of the guard immediately above the number designating the scale to be used, the front side thus acting somewhat in the nature of an index-hand or pointer. When the guard is in this position, its rear side will cover the designating number of the scale on the opposite side of the ruler, so that, if it is inadvertently sought to use the wrong scale, the discovery that the number as well as part of the scale is covered will prevent mistakes, which not unfrequently happen.

If the scale should be triangular, such as is shown in the drawing, the graduations on the faces not covered or indicated by the guard would not be used, for the reason that they would be in a reverse position, which would be sufficient warning to prevent their accidental use; besides, the guard, when applied to the rule, will prevent any other than the indicated scale from lying flat upon the paper.

It is obvious that my guard may be made of metal, hard rubber, or any suitable material, and of any desired shape. I therefore do not desire to limit myself to its application to any particular form of scale or form of guard; but,

Having thus described my invention, what I do claim as new, and desire to secure by Letters Patent, is—

An adjustable scale-guard, fitted to a rule or scale by elastic pressure, and formed with an extension, serving to designate the scale or edge being used, substantially as described, for the purpose specified.

SULLIVAN HASLETT.

Witnesses:
   H. L. WATTENBERG,
   G. M. PLYMPTON.